United States Patent
Wataya

(10) Patent No.: US 12,493,176 B2
(45) Date of Patent: Dec. 9, 2025

(54) OPTICAL UNIT, IMAGE PICKUP APPARATUS, ENDOSCOPE AND DRIVING METHOD OF OPTICAL UNIT

(71) Applicant: OLYMPUS CORPORATION, Hachioji (JP)

(72) Inventor: Yuichi Wataya, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 574 days.

(21) Appl. No.: 17/902,197

(22) Filed: Sep. 2, 2022

(65) Prior Publication Data

US 2022/0413279 A1   Dec. 29, 2022

Related U.S. Application Data

(63) Continuation of application No. PCT/JP2020/009458, filed on Mar. 5, 2020.

(51) Int. Cl.
*A61B 1/00* (2006.01)
*A61B 1/05* (2006.01)
(Continued)

(52) U.S. Cl.
CPC ......... *G02B 23/2438* (2013.01); *G02B 7/102* (2013.01); *G02B 7/105* (2013.01); *A61B 1/00188* (2013.01); *A61B 1/05* (2013.01)

(58) Field of Classification Search
CPC .. G02B 23/2438; G02B 23/2423; G02B 7/04; G02B 7/105; A61B 1/00188
See application file for complete search history.

(56) References Cited

U.S. PATENT DOCUMENTS

2010/0127580 A1   5/2010  Schrader
2013/0193778 A1*  8/2013  Wieters .............. A61B 1/00133
                                                          310/12.04
(Continued)

FOREIGN PATENT DOCUMENTS

EP    3 101 460 A1    12/2016
JP    2004-280039 A   10/2004
(Continued)

OTHER PUBLICATIONS

International Search Report dated Jun. 2, 2020, issued in counterpart International Application No. PCT/JP2020/009458, w/English translation (4 pages).

*Primary Examiner* — Anh Tuan T Nguyen
*Assistant Examiner* — Rynae E Boler
(74) *Attorney, Agent, or Firm* — WHDA, LLP

(57) ABSTRACT

An optical unit includes a fixed barrel configured to accommodate a moving barrel configured to hold an optical element configured to form an object image and formed of a nonmagnetic body to be able to advance and retract between a first position and a second position in a direction along an optical axis, a first magnet provided at the fixed barrel and configured to attract the moving barrel in a first direction along the optical axis to hold the moving barrel at the first position, a coil configured to attract the moving barrel in a second direction opposite to the first direction along the optical axis to hold the moving barrel at the second position by a magnetic field generated by being energized, and a second magnet provided at the moving barrel and configured to be attracted by the first magnet and the magnetic field of the coil.

6 Claims, 10 Drawing Sheets

(51) Int. Cl.
*G02B 7/10* (2021.01)
*G02B 7/105* (2021.01)
*G02B 23/24* (2006.01)

(56) References Cited

U.S. PATENT DOCUMENTS

| | | | |
|---|---|---|---|
| 2013/0314517 A1* | 11/2013 | Makiyama | A61B 1/045 348/65 |
| 2016/0213239 A1* | 7/2016 | Fujii | A61B 1/00163 |
| 2016/0334599 A1 | 11/2016 | Kono et al. | |

FOREIGN PATENT DOCUMENTS

| | | |
|---|---|---|
| JP | 2004-341325 A | 12/2004 |
| JP | 2006-276565 A | 10/2006 |
| JP | 2013-192354 A | 9/2013 |
| JP | 2015-141278 A | 8/2015 |
| JP | 2016-509829 A | 3/2016 |
| JP | 2016-156953 A | 9/2016 |
| JP | 2017-63845 A | 4/2017 |
| JP | 2018-82804 A | 5/2018 |
| WO | 2015/114867 A1 | 8/2015 |
| WO | 2016/009842 A1 | 1/2016 |

* cited by examiner

OPTICAL UNIT, IMAGE PICKUP APPARATUS, ENDOSCOPE AND DRIVING METHOD OF OPTICAL UNIT

CROSS REFERENCE TO RELATED APPLICATION

This application is a continuation application of PCT/JP2020/009458 filed on Mar. 5, 2020, the entire contents of which are incorporated herein by this reference.

BACKGROUND OF THE INVENTION

1. Field of the Invention

The present invention particularly relates to an optical unit provided at a distal end portion of an insertion portion configured to be inserted into a subject, an image pickup apparatus, an endoscope and a driving method of the optical unit, in the image pickup apparatus provided in the endoscope.

2. Description of the Related Art

As is well-known, endoscopes are widely used for observation, treatment and the like of insides of bodies (insides of body cavities) of living bodies, or inspections, repairs and the like in industrial plant facilities. Such an endoscope includes a long insertion portion to be inserted into, for example, a body cavity and an abdominal cavity of a subject, or a duct. In recent years, an electronic endoscope containing an image pickup apparatus in a distal end portion of an insertion portion has been known.

Examples of a configuration of an image pickup apparatus provided in such an endoscope include a configuration in which a movable lens is moved by advancing and retracting a movable barrel of a magnetic body by an actuator that moves the movable barrel of the magnetic body by using an electric magnet, as described in International Publication No. WO2016/009842.

As the conventional image pickup apparatus, there is known an image pickup apparatus that realizes functions of zoom, focus and the like by advancing and retracting the movable lens by providing the actuator using an electric magnet in a lens unit.

SUMMARY OF THE INVENTION

An optical unit in one aspect of the present invention includes a moving barrel configured to hold an optical element configuring a lens unit configured to form an object image, and formed of a nonmagnetic body, a fixed barrel configured to accommodate the moving barrel to be able to advance and retract between a first position and a second position in a direction along an optical axis of the lens unit, a first magnet provided at the fixed barrel, and configured to attract the moving barrel in a first direction along the optical axis to hold the moving barrel at the first position, a coil configured to attract the moving barrel in a second direction opposite to the first direction along the optical axis to hold the moving barrel at the second position, by a magnetic field generated by being energized, and a second magnet provided at the moving barrel, and configured to be attracted by the first magnet and the magnetic field of the coil.

An image pickup apparatus in one aspect of the present invention is an image pickup apparatus loaded on a distal end portion of an insertion portion of an endoscope, and includes an optical unit including a moving barrel configured to hold an optical element configuring a lens unit configured to form an object image, and formed of a nonmagnetic body, a fixed barrel configured to accommodate the moving barrel to be able to advance and retract between a first position and a second position in a direction along an optical axis of the lens unit, a first magnet provided at the fixed barrel, and configured to attract the moving barrel in a first direction along the optical axis to hold the moving barrel at the first position, a coil configured to attract the moving barrel in a second direction opposite to the first direction along the optical axis to hold the moving barrel at the second position, by a magnetic field generated by being energized, and a second magnet provided at the moving barrel, and configured to be attracted by the first magnet and the magnetic field of the coil, and an image pickup device configured to receive light condensed and formed by the optical element and photoelectrically convert the light.

An endoscope in one aspect of the present invention includes an image pickup apparatus including an optical unit including a moving barrel configured to hold an optical element configuring a lens unit configured to form an object image, and formed of a nonmagnetic body, a fixed barrel configured to accommodate the moving barrel to be able to advance and retract between a first position and a second position in a direction along an optical axis of the lens unit, a first magnet provided at the fixed barrel, and configured to attract the moving barrel in a first direction along the optical axis to hold the moving barrel at the first position, a coil configured to attract the moving barrel in a second direction opposite to the first direction along the optical axis to hold the moving barrel at the second position, by a magnetic field generated by being energized, and a second magnet provided at the moving barrel, and configured to be attracted by the first magnet and the magnetic field of the coil, and an image pickup device configured to receive light condensed and formed by the optical element and photoelectrically convert the light, and an insertion portion in which the image pickup apparatus is loaded on a distal end portion.

A driving method of an optical unit in one aspect of the present invention includes, when moving a moving barrel held at a first position by a first magnetic force of a first magnet to a second position, passing a current in a predetermined direction to a coil to cause the coil to generate a second magnetic force stronger than the first magnetic force, attracting a second magnet provided at the moving barrel by the second magnetic force to move the moving barrel to the second position, and holding the moving barrel at the second position by the second magnetic force, and when moving the moving barrel to the first position from the second position, passing a current in an opposite direction to the predetermined direction to the coil for only a predetermined time to invert the second magnetic force to attract the second magnet of the moving barrel by a repulsion force to move the moving barrel to the first position, and holding the moving barrel at the first position only by an attraction force by the first magnetic force of the first magnet after stopping energization to the coil.

DETAILED DESCRIPTION OF THE PREFERRED EMBODIMENTS

Hereinafter, an image pickup apparatus provided in an endoscope of one aspect of the present invention is described based on the drawings. Note that in the following explanation, the drawings based on each embodiment are schematic, attention should be paid to the fact that the relationship between the thickness and the width of each part, ratios of the thicknesses of respective parts and the like are different from the actual relationship and ratios, and there may be parts where the relationships and ratios of mutual dimensions are different among the drawings.

As an endoscope in the following configuration explanation, there is illustrated a so-called flexible endoscope an insertion portion of which has flexibility to be inserted into a body cavity such as a bronchus, a urinary system, a stomach from an esophagus, a small intestine and a large intestine of a living body, but the endoscope in the following configuration explanation can also be applied to a so-called rigid endoscope with a rigid insertion portion including a bending portion that is used for surgery.

An endoscope of one aspect of the present invention is described based on the drawings.

Figure 1:
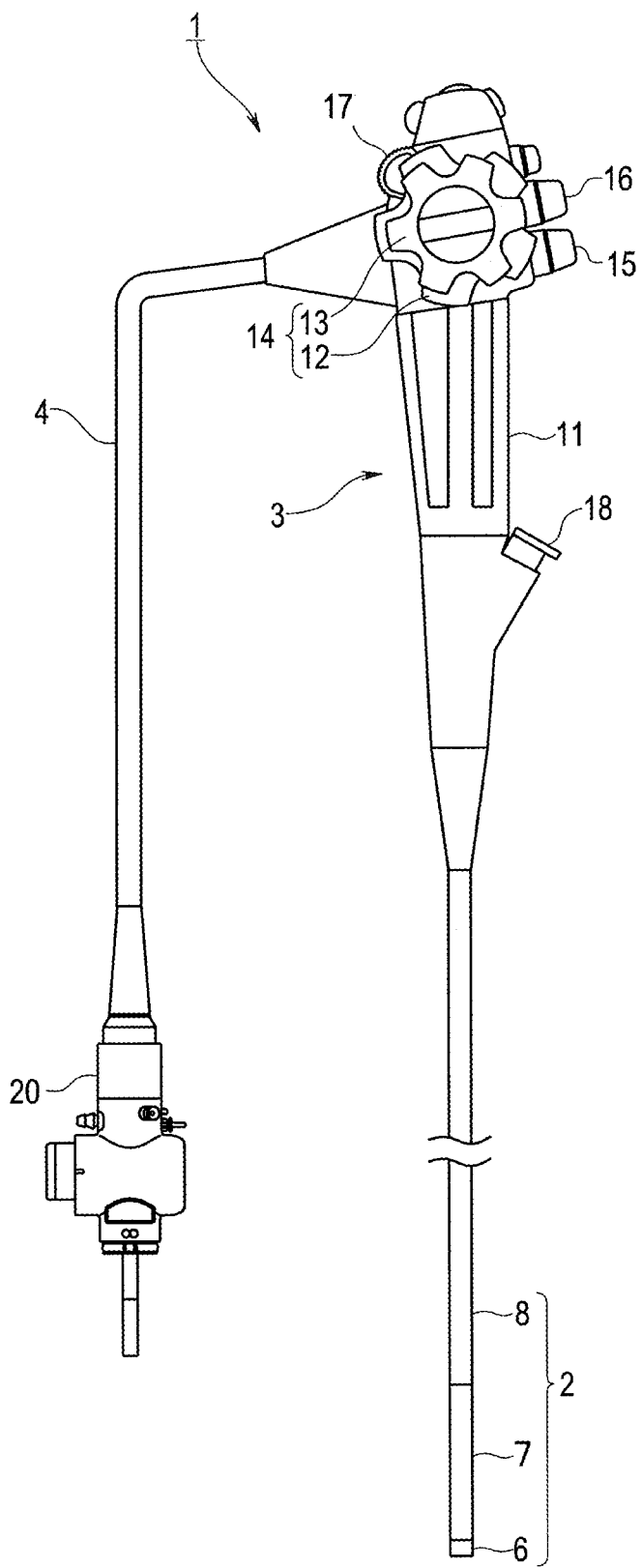
FIG. 1 is a view showing an external appearance of an endoscope of one aspect of the present invention.

As shown in FIG. 1, an endoscope 1 of the present embodiment is configured by including a long elongated insertion portion 2 configured to be inserted into a subject, an operation portion 3, and a universal cable 4 that is a composite cable. The insertion portion 2 of the endoscope 1 is configured by including a distal end portion 6, a bending portion 7, and a flexible tube portion 8 in order from a distal end.

On the operation portion 3, a bending operation knob 14 for operating to bend the bending portion 7 of the insertion portion 2 is turnably placed, and switches 15 and 16, a fixing lever 17 and the like are provided. The switches 15 and 16 switch various endoscope functions, and observation images such as a near point observation, a far point observation, release, and still images. The fixing lever 17 fixes turning of the bending operation knob 14.

Note that in the bending operation knob 14, two rotation knobs each in a substantially disk shape that are a UD bending operation knob 12 for operating to bend the bending portion 7 in an up-down direction, and an RL bending operation knob 13 for operating to bend the bending portion 7 in a left-right direction are placed to be superimposed on each other.

A connection portion of the insertion portion 2 and the operation portion 3 is configured by including a grasping portion 11 grasped by a user, and a treatment instrument insertion channel insertion portion 18 that is disposed in the grasping portion 11 to be an opening portion of a treatment instrument insertion channel that allows insertion of various treatment instruments and is placed in the insertion portion 2.

The universal cable 4 provided to extend from the operation portion 3 includes an endoscope connector 20 attachable to and detachable from a light source apparatus not illustrated, at an extension end. Note that the endoscope 1 of the present embodiment transmits illumination light from the light source apparatus (not illustrated) to the distal end portion 6 by a light guide bundle (not illustrated) of illumination means inserted through and placed in the insertion portion 2, the operation portion 3 and the universal cable 4.

To the endoscope connector 20, a coil-shaped coil cable is connected though not illustrated here, and an electric connector attachable to and detachable from a video processor (not illustrated) is provided at an extension end of the coil cable.

Figure 2:
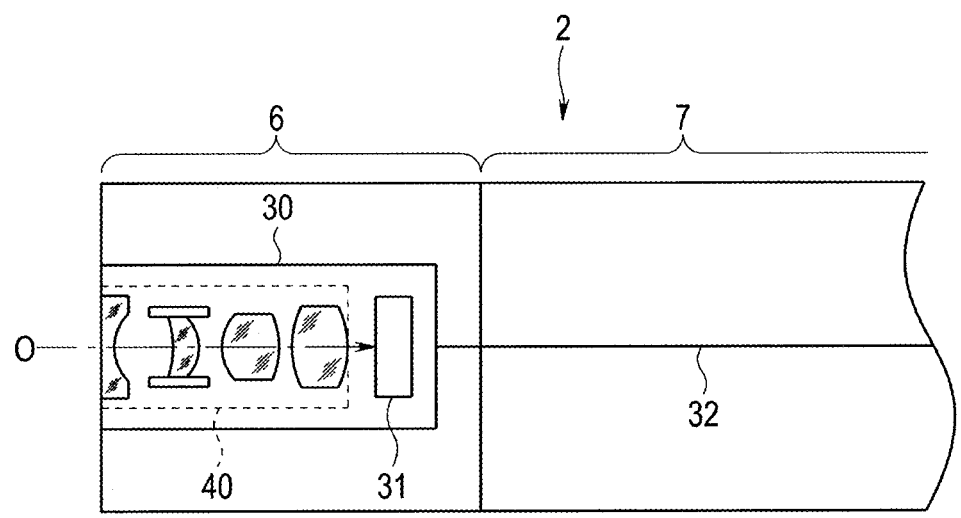
FIG. 2 is a schematic view showing a configuration of a distal end portion of an insertion portion in one aspect of the present invention.

As shown in FIG. 2, an image pickup apparatus 30 is loaded on the distal end portion 6 of the insertion portion 2.

The image pickup apparatus 30 includes a lens unit 40 that is an optical unit and includes a solid image pickup device 31 that is an image sensor such as CCD, or CMOS that receives an object image formed by the lens unit 40 and photoelectrically converts the object image. The lens unit 40 is configured by at least one optical element.

Figure 3:
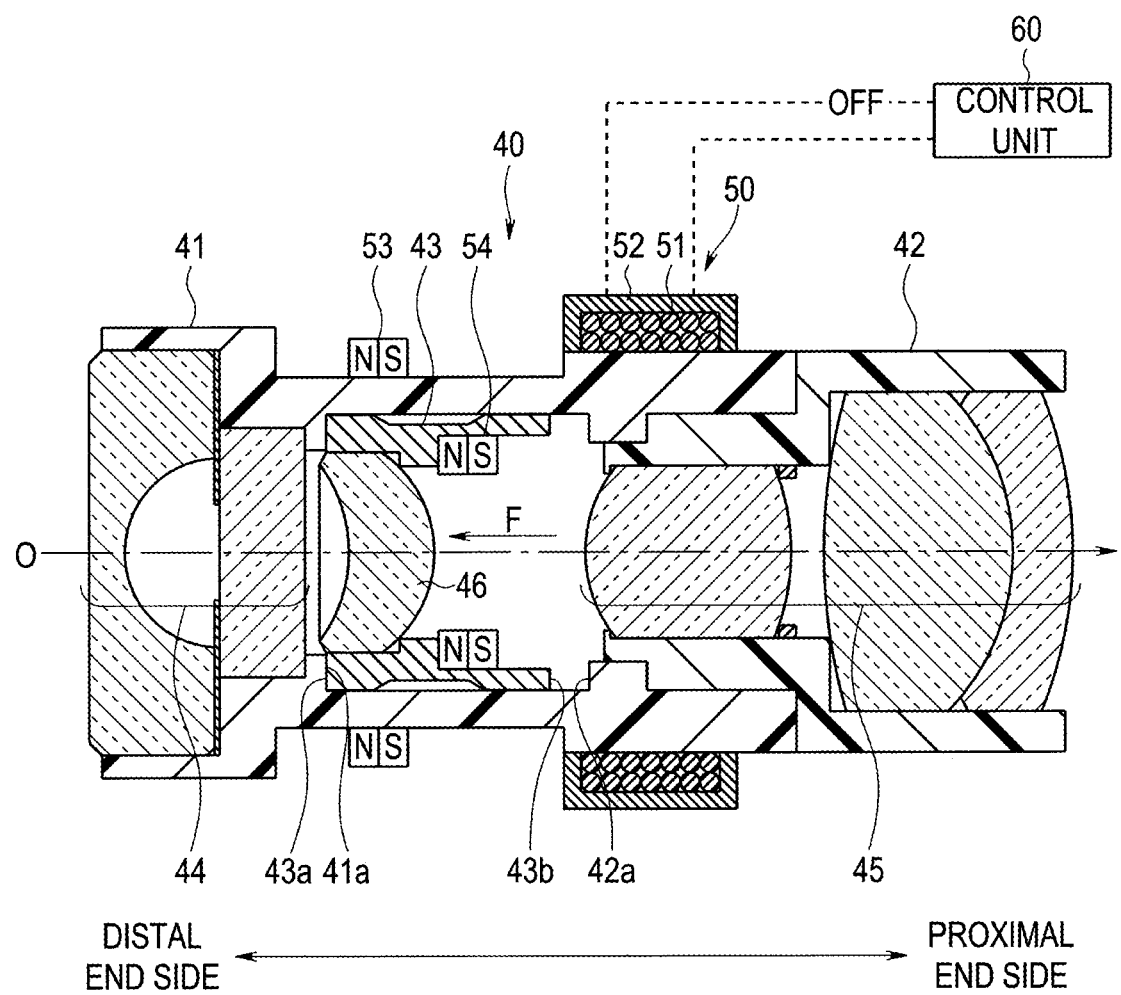
FIG. 3 is a cross-sectional view showing a configuration of a lens unit in which a movable lens barrel moves to a distal end side in one aspect of the present invention.

As shown in FIG. 3, the lens unit 40 of the present embodiment includes a first lens holding barrel 41 that is a fixed barrel on a distal end side, a second lens holding barrel 42 that is a fixed barrel fitted to a proximal end side of the first lens holding barrel 41, and a movable lens barrel 43 that is a moving barrel accommodated in the first lens holding barrel 41 to be able to advance and retract. The movable lens barrel 43 moves along an optical axis O of the lens unit 40.

The first lens holding barrel 41 is formed of a nonmagnetic material such as a rigid resin, a nonmagnetic stainless steel, or aluminum, and holds a front group lens 44 that is a fixed lens group, and is configured by optical elements that are two objective optical systems here.

In the first lens holding barrel 41, a first magnet 53 that is a permanent magnet is placed on an outer periphery of a middle portion on a distal end side. The first magnet 53 is placed in a state in which a distal end side is magnetized to an N pole, and a proximal end side is magnetized to an S pole, for example, and may be in a ring shape that covers the first lens holding barrel 41 in a circumferential direction, or may have a configuration in which a plurality of first magnets are provided in the circumferential direction of the first lens holding barrel 41. Note that as for a magnetization direction of the first magnet 53, S/N poles may be opposite.

In the first lens holding barrel 41, an actuator 50 is provided on an outer peripheral portion on a proximal end side from the first magnet 53. The actuator 50 is an electric magnet configured by including a coil portion 51 in which a metal element wire of a copper or the like is wound on a proximal end outer peripheral portion of the first lens holding barrel 41 in a predetermined direction, and a yoke 52 of a metal such as iron or copper that is placed to cover the coil portion 51 and configured to amplify a magnetic attraction force.

The actuator 50 is electrically connected to a control unit 60 that controls and energizes a current to the coil portion 51. Note that the control unit 60 is provided at external equipment, and controls ON/OFF of energization to the actuator 50 and an energization direction by a user operation of the switches 15 and 16 provided at the operation portion 3 of the endoscope 1.

The second lens holding barrel 42 is also formed of a nonmagnetic material such as a rigid resin, a nonmagnetic stainless steel, or aluminum, and holds a rear group lens 45 that is a fixed lens group and is configured by optical elements that are three objective optical systems, here.

The movable lens barrel 43 is formed of, for example, a nonmagnetic material such as aluminum, and holds a movable lens 46 of an optical element that is one objective optical system here. On an inner periphery of a middle portion of the movable lens barrel 43, a second magnet 54 is placed. The second magnet 54 is a permanent magnet that is attracted by the first magnet 53 provided at the first lens holding barrel 41.

The second magnet 54 is also placed in a state in which a distal end side is magnetized to the N pole and a proximal end side is magnetized to the S pole, for example. Note that as for a magnetization direction of the second magnet 54, the S/N poles may be opposite.

The first magnet 53 and the second magnet 54 are placed so that magnetic poles (S/N) that face each other are in different directions from each other in front and rear along the optical axis O of the lens unit 40. In other words, in the first magnet 53 and the second magnet 54, the S/N poles in a front-back direction along the optical axis O are placed to have opposite polarities from each other.

Note that the second magnet 54 may be in a ring shape provided in an inner circumferential direction of the movable lens barrel 43, or may have a configuration in which a plurality of second magnets 54 are provided in the inner circumferential direction of the movable lens barrel 43.

In the lens unit 40 of the image pickup apparatus 30 configured as above, when a current is not passed to the coil portion 51 of the actuator 50 (OFF time), stress is generated, in which the first magnet 53 and the second magnet 54 attract each other, due to a magnetic action by a magnetic force due to a magnetic field of the first magnet 53 and a magnetic force due to a magnetic field of the second magnet 54 that are in different directions.

Thereby, the second magnet 54 is attracted to the first magnet 53 fixed to the first lens holding barrel 41, and the movable lens barrel 43 is attracted to a front group lens 44 side on the distal end side that is a front side along the optical axis O. In this state, the movable lens barrel 43 is given a force F by which the movable lens barrel 43 is attracted to the distal end side by a magnetic force of the first magnet 53.

In the movable lens barrel 43, a distal end surface 43$a$ abuts on an end surface 41$a$ to be a distal end side stopper of an inward flange provided at an inner periphery of a middle of the first lens holding barrel 41, and a stop position of movement to the distal end side is defined.

Figure 4:
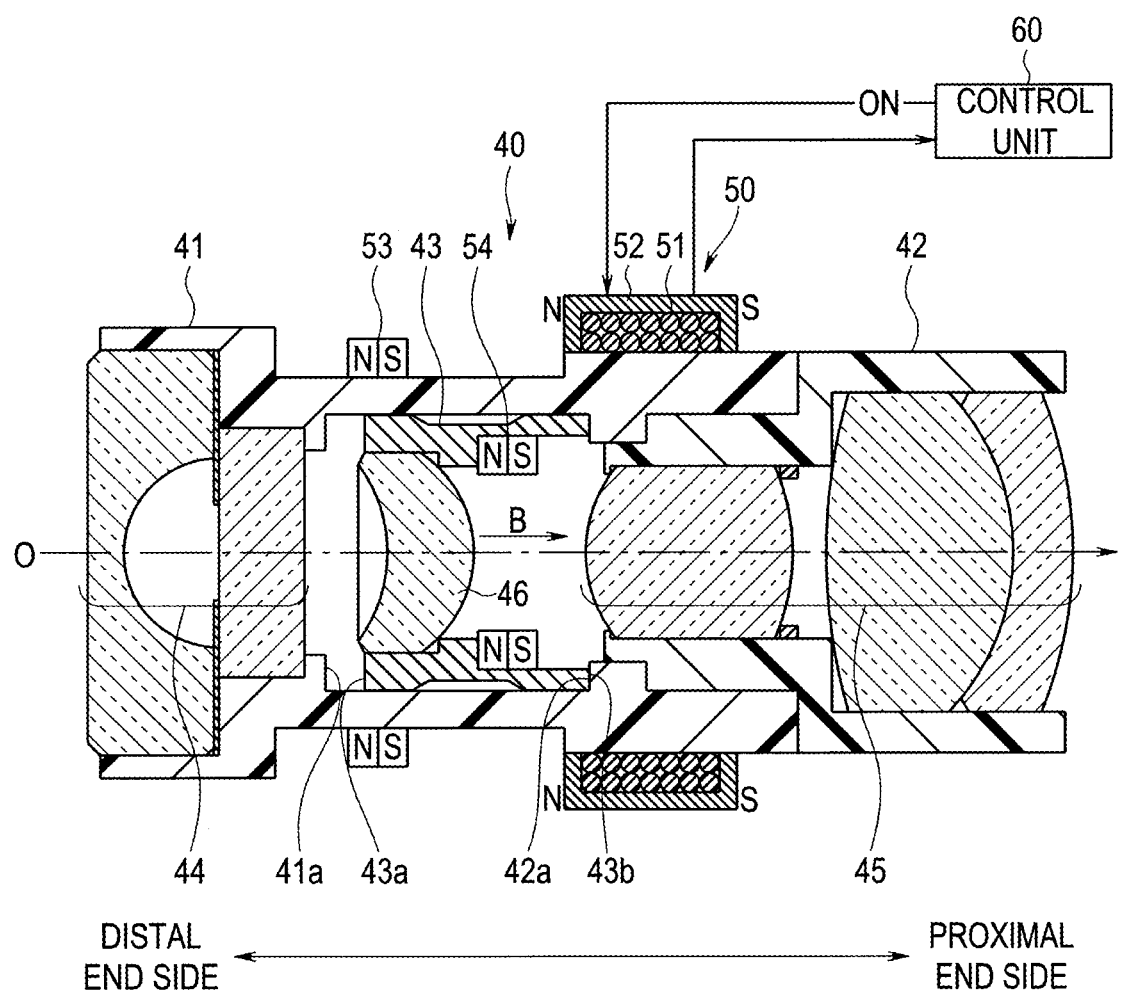
FIG. 4 is a cross-sectional view showing a configuration of the lens unit in which the movable lens barrel moves to a proximal end side in one aspect of the present invention.

When the actuator 50 is controlled to drive by the control unit 60 by a user operation of the switches 15 and 16, a current is passed in a predetermined direction to the coil portion 51 of the actuator 50 as shown in FIG. 4, in the lens unit 40 of the image pickup apparatus 30 (ON time).

Thereby, in the actuator 50, a magnetic field amplified by the yoke 52 that attracts the second magnet 54 is generated. In other words, the actuator 50 that is an electric magnet is magnetized.

At this time, as the current flows in the predetermined direction to the coil portion 51, the actuator 50 is magnetized to magnetic poles (S/N) different in front and the rear along the optical axis O of the lens unit 40 with respect to the magnetic poles (S/N) of the second magnet 54 of the movable lens barrel 43. In other words, the actuator 50 is in a state in which the magnetic field generated from the coil portion 51 is amplified by the yoke 52, and a distal end side of the yoke 52 is magnetized to the N pole that attracts the S pole to which the proximal end side of the second magnet 54 is magnetized, whereas a proximal end side of the yoke 52 is magnetized to the S pole, here.

Therefore, a stress is generated, in which the actuator 50 and the second magnet 54 attract each other, due to the magnetic action of the magnetic force by the magnetic field generated from the actuator 50 and the magnetic force by the magnetic field of the second magnet 54.

Note that in the actuator 50, a magnitude of the current to be passed to the coil portion 51 from the control unit 60 is set so that the magnetic force by the magnetic field to be generated is stronger (larger) than the magnetic force by the magnetic field of the first magnet 53.

In this state, the movable lens barrel 43 is given a force B by which the movable lens barrel 43 moves to the proximal end side, by being attracted by the magnetic force of magnetization of the actuator 50, against the attraction force to the distal end side by the first magnet 53.

In the movable lens barrel 43, a proximal end surface 43$b$ abuts on an abutment surface 42$a$ that is formed into a protruded shape in an inside diameter direction to be a proximal end side stopper of the first lens holding barrel 41, and is to be a position restriction portion of movement to the proximal end side, and a stop position of movement to the proximal end side is defined.

In this way, in the lens unit 40 of the image pickup apparatus 30, energization to the actuator 50 is stopped, and thereby the movable lens barrel 43 that moves to advance and retract along the optical axis O is moved to the distal end side by the attraction force of the first magnet 53 that magnetically acts on the second magnet 54.

In the lens unit 40 of the image pickup apparatus 30, the current in the predetermined direction is passed to the actuator 50, whereby the magnetic force that is larger than the magnetic force of the first magnet 53 is generated by the actuator 50, and the movable lens barrel 43 that moves to advance and retract along the optical axis O to the proximal end side by the attraction force of the actuator 50 against the attraction force of the first magnet 53.

As described above, the image pickup apparatus 30 that is loaded on the distal end portion 6 of the insertion portion 2 of the endoscope 1 of the present embodiment is configured to move the movable lens barrel 43 to the distal end side and hold the movable lens barrel 43 on the distal end side by the magnetic force of the first magnet 53 that is placed at the lens unit 40 when the actuator 50 is not energized.

The image pickup apparatus 30 is configured to move the movable lens barrel 43 to the proximal end side and hold the movable lens barrel 43 on the proximal end side by the magnetic force generated by magnetizing the actuator 50 that is an electric magnet by energization, against the magnetic force of the first magnet 53 placed at the first lens holding barrel 41 when the actuator 50 of the lens unit 40 is energized.

Thereby, the image pickup apparatus 30 is configured to reduce heat generation of the actuator, prevent image quality deterioration and shortening of life of various components due to a high temperature of the solid image pickup device 31 that is an image sensor, and to be able to reduce power consumption, because energization of the actuator 50 is not performed in a state in which the movable lens barrel 43 of the lens unit 40 is moved to the distal end side and is held on the distal end side.

Accordingly, the image pickup apparatus 30 can prevent image quality deterioration and shortening of life of the components due to heat generation of the actuator 50 configured to drive the movable lens barrel 43 that is a moving barrel and can reduce power consumption.

Even if a large impact load is sometimes applied to the distal end portion 6 of the insertion portion 2 in the endoscope 1 due to handling of a user, a crack hardly occurs because the actuator 50 provided at the lens unit 40 of the image pickup apparatus 30 is contained at a middle position on the proximal end side from the distal end side of the distal end portion 6, a failure of the actuator 50 in particular of the image pickup apparatus 30 is reduced, and resistance to the impact load to the distal end portion 6 is enhanced.

The image pickup apparatus 30 preferably optically sets a time of the state in which the movable lens barrel 43 of the lens unit 40 is located on the distal end side as a far point observation (WIDE), and a time of the state in which the movable lens barrel 43 is located on the proximal end side as a near point observation (TELE).

Thereby, at a time of observation by the endoscope 1, a frequency of use of the far point observation is high, so that by using the endoscope 1 mainly in a state in which energization of the actuator 50 is not performed, it is possible to reduce power consumption and heat generation of the actuator 50 due to a high temperature of the coil portion 51.

Note that the image pickup apparatus 30 may optically set a time of the state in which the movable lens barrel 43 is located on the distal end side as the near point observation (TELE), whereas a time of the state in which the movable lens barrel 43 is located on the proximal end side as the far point observation (WIDE) by optical lens setting of the lens unit 40.

The movable lens barrel 43 is not limited to the lens barrel that is movable only between the two holding positions that are the far point and the near point. Needless to say, a third holding position of the movable lens barrel 43 may be added so that a farther point observation or a nearer point observation is possible, for example, and the movable lens barrel 43 may be configured to be movable to the third holding position.

The image pickup apparatus 30 may be configured to adjust focus, besides optical zoom that switches between the far point observation and the near point observation, by advancing and retracting the movable lens barrel 43 of the lens unit 40.

(First Modification)

Figure 5:
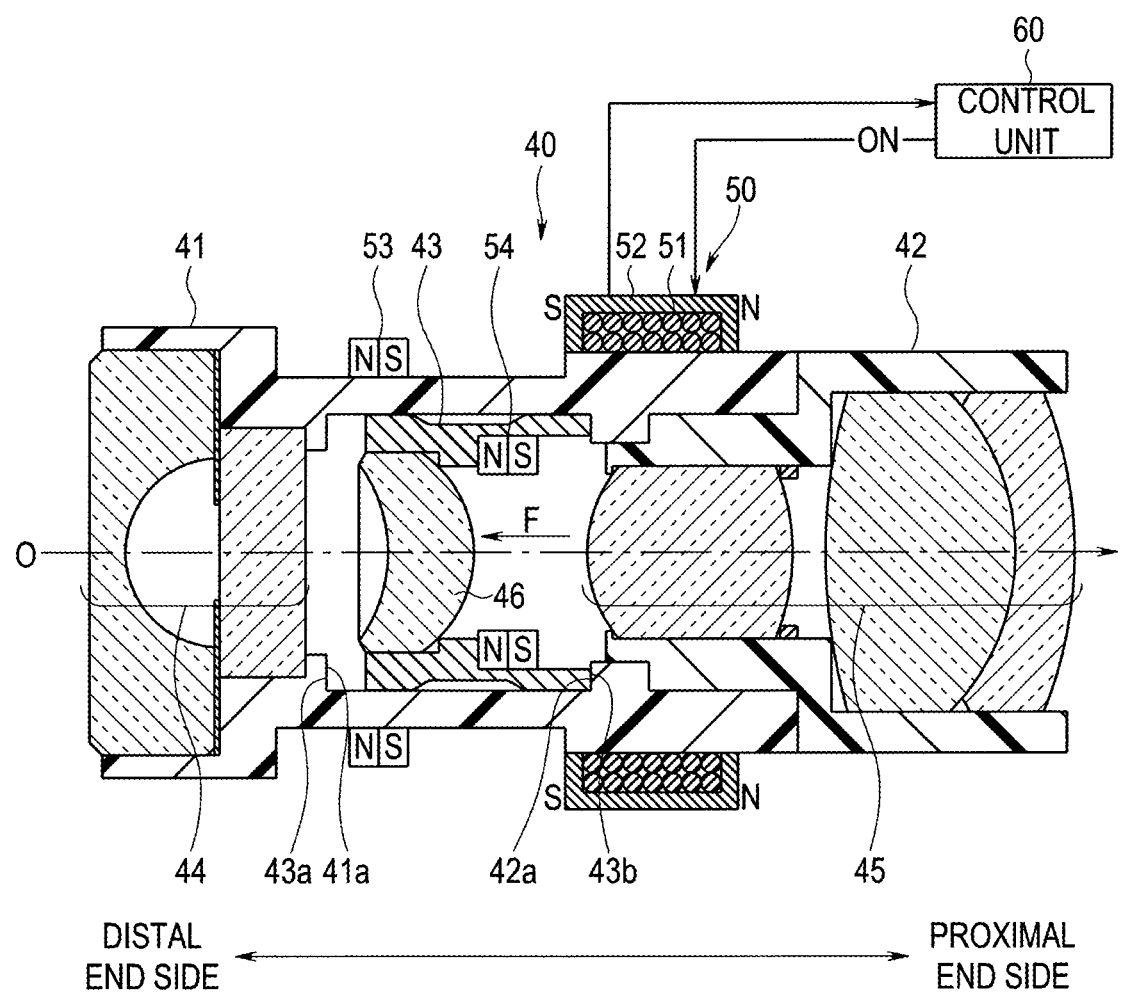
FIG. 5 is a cross-sectional view showing a configuration of a lens unit at a time of moving a movable lens barrel to a distal end side from a proximal end side of a first modification.

As shown in FIG. 5, an image pickup apparatus 30 may be configured such that a control unit 60 controls and drives a movable lens barrel 43 to a distal end side by making a passing direction of the current flowing in an actuator 50 an opposite direction for only a predetermined time when the movable lens barrel 43 of a lens unit 40 is moved to the distal end side from a time of a state in which the movable lens barrel 43 of a lens unit 40 is located on a proximal end side.

In other words, the actuator 50 is caused to generate a magnetic field in an opposite direction that is amplified by a yoke 52 that repels a second magnet 54 of the movable lens barrel 43.

As the current in the opposite direction to the above described predetermined direction flows in a coil portion 51, the actuator 50 is magnetized to magnetic poles (S/N) that generate a repulsion force to the magnetic poles (S/N) of the second magnet 54 of the movable lens barrel 43. In other words, the actuator 50 is in a state in which the magnetic field generated from a coil portion 51 is amplified by the yoke 52, and here, a distal end side of the yoke 52 is magnetized to the S pole that repels the S pole to which the proximal end side of the second magnet 54 is magnetized, whereas the proximal end side of the yoke 52 is magnetized to the N pole here.

Consequently, a stress is generated, in which the actuator 50 and the second magnet 54 repel each other, due to a magnetic action of a magnetic force by the magnetic field generated from the actuator 50 and a magnetic force by the magnetic field of the second magnet 54 of the movable lens barrel 43.

Thereby, the movable lens barrel 43 is given a force F that starts the movable lens barrel 43 toward the distal end side by the magnetic force of the actuator 50 for only the predetermined time, and is attracted to the distal end side by the magnetic force of the first magnet 53 in addition. In this way, by changing the direction of the current to the actuator 50, it is possible to move the movable lens barrel 43 that is located on the proximal end side smoothly to the distal end side.

(Second Modification)

Figure 6:
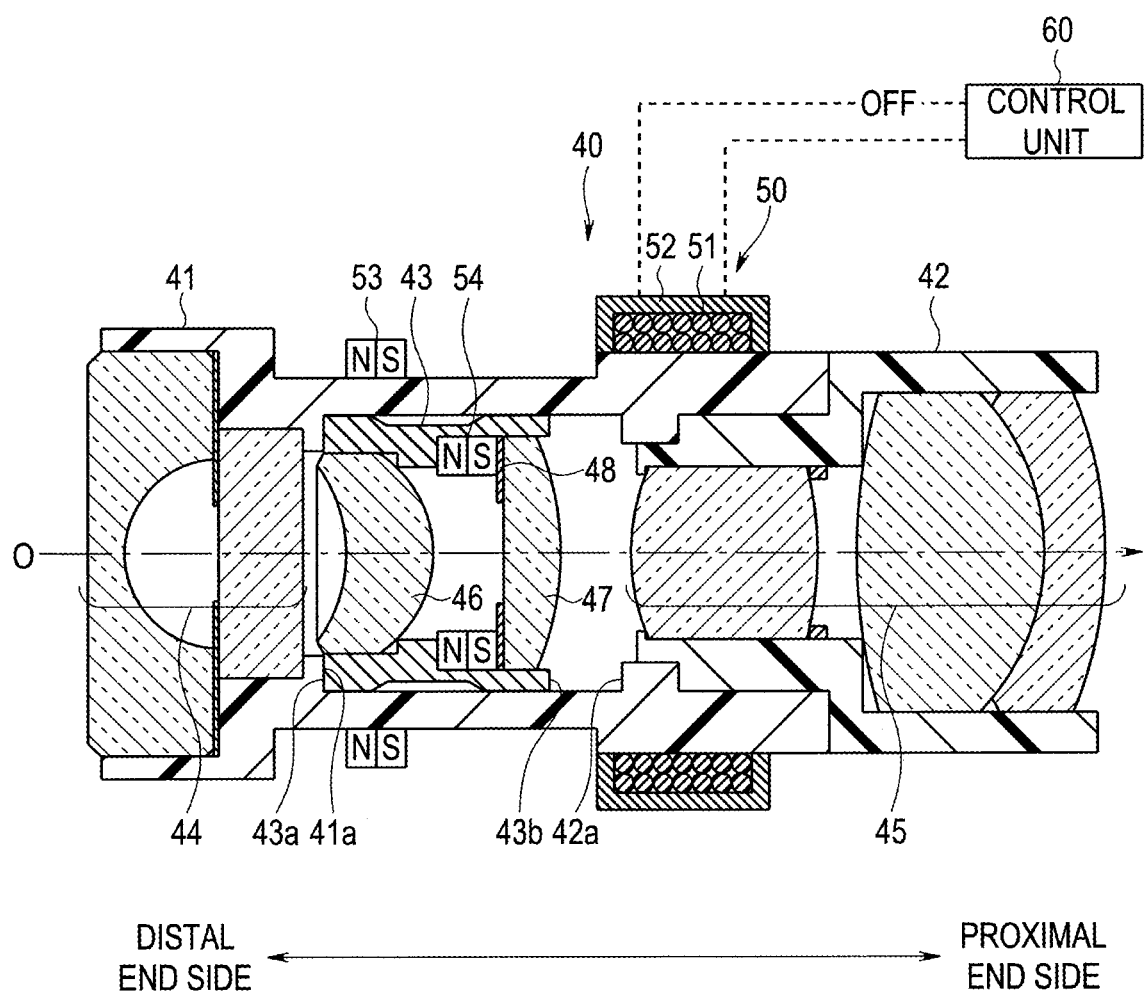
FIG. 6 is a cross-sectional view showing a configuration of a lens unit in which a movable lens barrel moves to a distal end side of a second modification.

As shown in FIG. 6, in a case of a configuration in which a movable lens barrel 43 includes a plurality of, here, two movable lenses 46 and 47, a lens unit 40 of an image pickup apparatus 30 may be configured such that a proximal end surface of a second magnet 54 also functions as a positioning member of a distal end surface of the movable lens 47 on a proximal end side. Note that the proximal end surface of the second magnet 54 may be configured to perform positioning by abutting on an optical aperture 48 provided on the distal end surface of the movable lens 47 as shown in FIG. 6.

By the configuration like this, the image pickup apparatus 30 does not need to be provided with a positioning member such as a spacer separately, by using the second magnet 54 provided at the movable lens barrel 43 of the lens unit 40 as the positioning member for the second movable lens 47 and/or the optical aperture 48, and therefore it is possible to reduce the number of components and miniaturize (shorten) the movable lens barrel 43.

(Third Modification)

Figure 7:
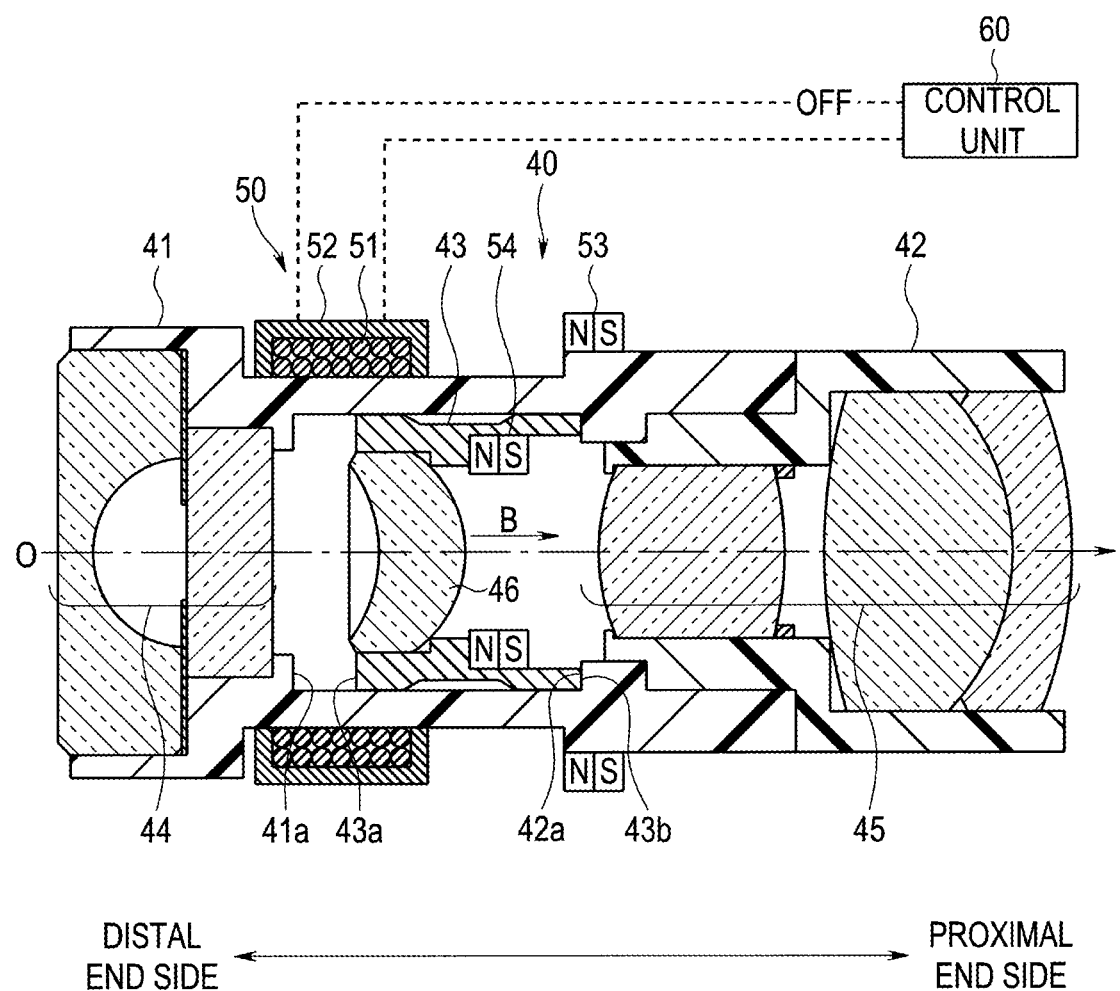
FIG. 7 is a cross-sectional view showing a configuration of a lens unit in which a movable lens barrel moves to a distal end side of a third modification.

As shown in FIG. 7, a lens unit 40 of an image pickup apparatus 30 may be configured such that an actuator 50 configured by a first coil portion 51 and a yoke 52 is provided on a distal end side of a first lens holding barrel 41, and a first magnet 53 is provided on a proximal end side of the first lens holding barrel 41.

(Fourth Modification)

Figure 8:
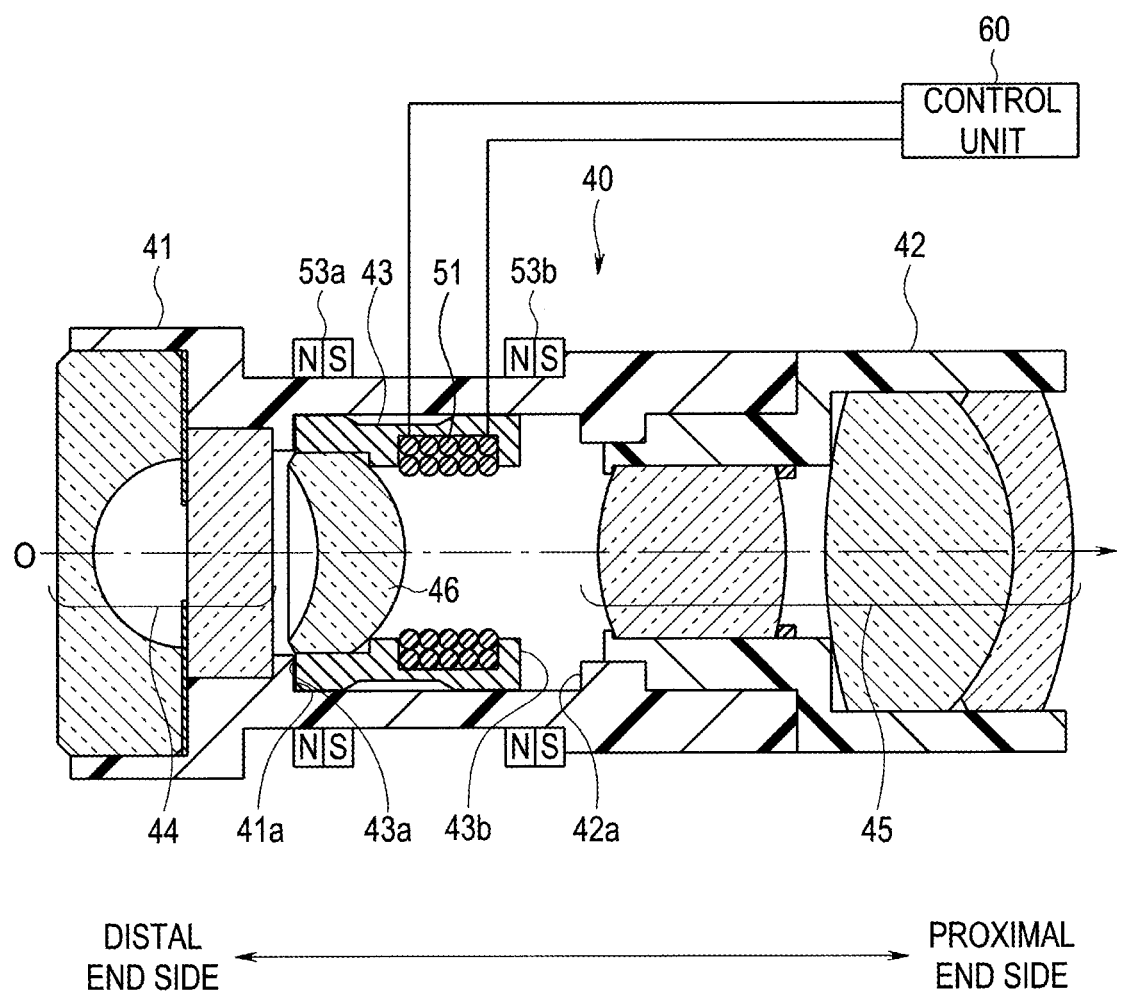
FIG. 8 is a cross-sectional view showing a configuration of a lens unit in which a movable lens barrel moves to a distal end side of a fourth modification.

As shown in FIG. 8, a lens unit 40 of an image pickup apparatus 30 may be configured such that two magnets 53a and 53b are provided in a front-back direction at a first lens holding barrel 41, and a coil portion 51 is provided at a movable lens barrel 43. Note that the movable lens barrel 43 may be caused to function as a yoke that amplifies a magnetic field generated from the coil portion 51 by forming the movable lens barrel 43 of a magnetic body by using a metal such as iron.

(Fifth Modification)

Figure 9:
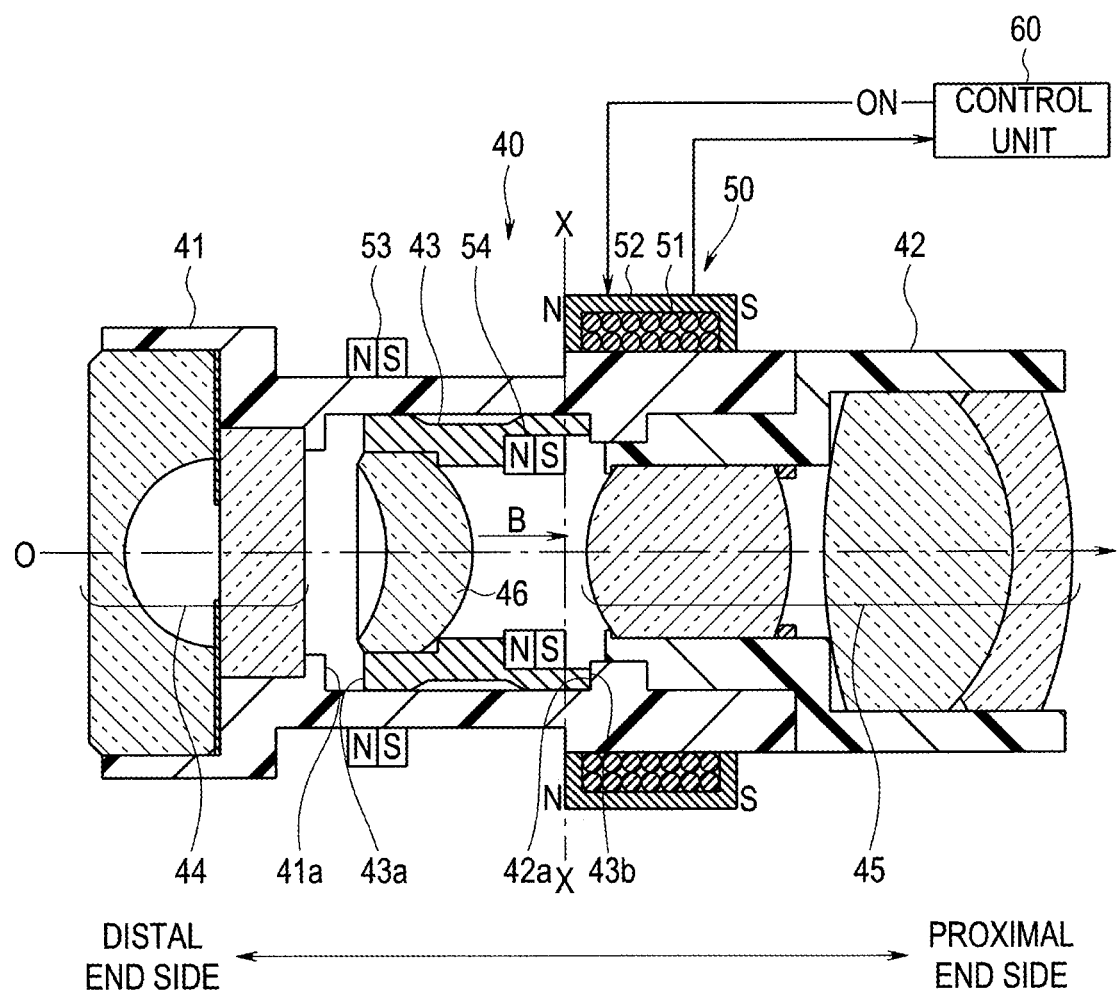
FIG. 9 is a cross-sectional view showing a configuration of a lens unit in which a movable lens barrel moves to a proximal end side of a fifth modification.

In a lens unit 40 of an image pickup apparatus 30 of a present modification, in a state in which a proximal end surface 43b of a movable lens barrel 43 abuts on an abutment surface 42a of a first lens holding barrel 41 and movement to a proximal end side is stopped, a yoke 52 and a second magnet 54 are provided at a position at which an end surface on a distal end side of the yoke 52 of an actuator 50 and an end surface on a proximal end side of the second magnet 54, of the movable lens barrel 43 correspond to each other in a direction orthogonal to an optical axis O, as shown by an imaginary line X of an alternate long and short dash line in FIG. 9.

In this way, the lens unit 40 can sufficiently obtain a magnetic force that holds the movable lens barrel 43 on the proximal end side even if the current to be passed to the coil portion 51 is reduced, by the configuration in which the proximal end surface of the magnet 54 that is loaded on the movable lens barrel 43 is disposed in an inside diameter direction of a distal end surface of the yoke 52 when the movable lens barrel 43 is held at a position that is moved to the proximal end side.

Figure 10:
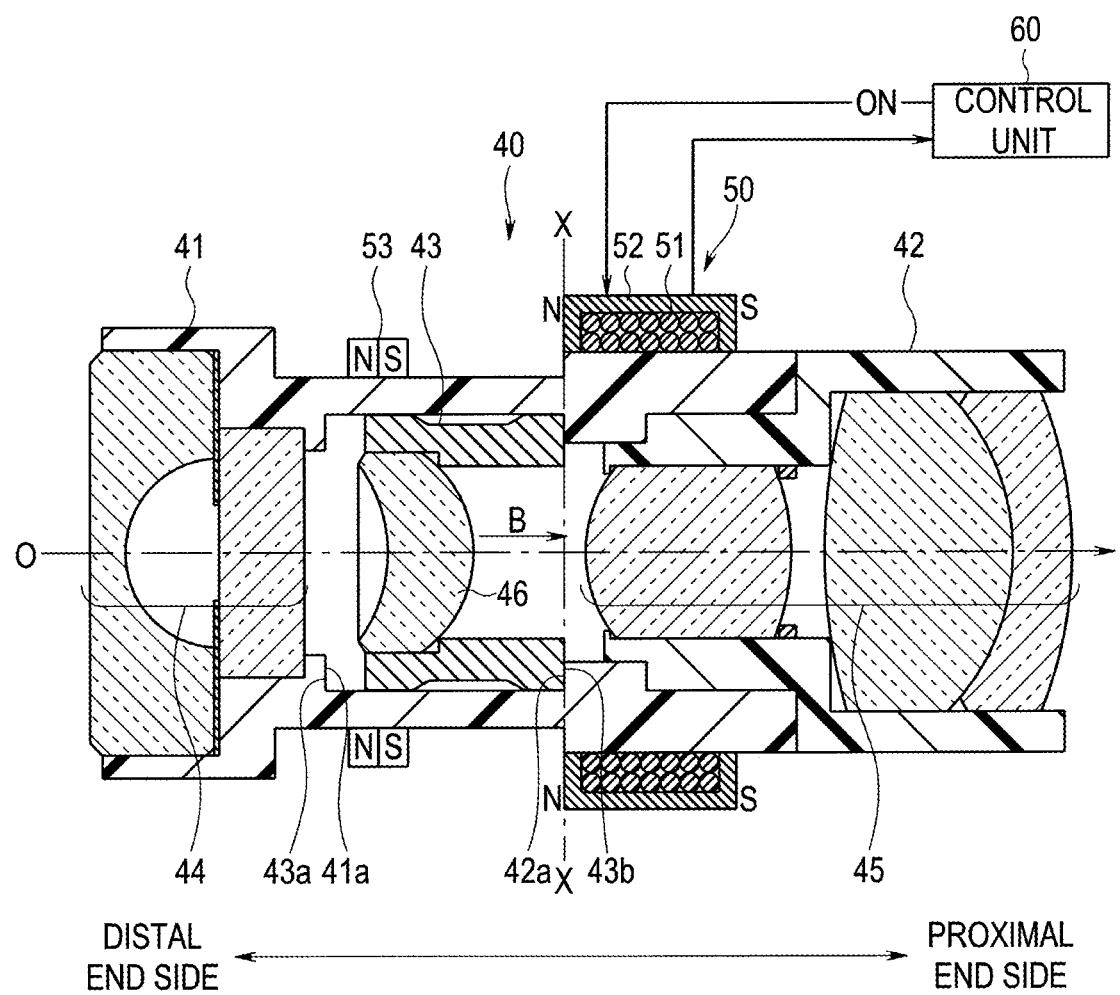
FIG. 10 is a cross-sectional view showing a configuration of a lens unit in which a movable lens barrel formed of a magnetic body moves to a proximal end side of the fifth modification.

Note that when the lens unit 40 is not provided with the second magnet 54, and the movable lens barrel 43 is formed of a magnetic body such as iron as shown in FIG. 10, a position of the abutment surface 42a of the yoke 52 and the first lens holding barrel 41 can be set at a position at which an end surface on a distal end side of the yoke 52 of the actuator 50 and an end surface on the proximal end side of the movable lens barrel 43 correspond to each other in a direction orthogonal to an optical axis O, in a state in which the movable lens barrel 43 is held at the position that is moved to the proximal end side.

In the above configuration, adjustment at a time of assembly is easily performed so that a distal end of the yoke 52 is caused to correspond to the abutment surface 42a of the first lens holding barrel 41 on which a proximal end surface 43b of the movable lens barrel 43 abuts, and the yoke 52 can be placed with high precision.

In other words, there is a limit to processing tolerances of various components of the lens unit 40, the smaller the lens unit 40, the more the lens unit 40 is affected by the tolerances relatively, and is affected by integrated tolerances of a plurality of members such as the yoke 52, the movable lens barrel 43, the first lens holding barrel 41 and the second lens holding barrel 42.

Therefore, in the lens unit 40, the distal end of the yoke 52 and the abutment surface 42a of the first lens holding barrel 41 on which the proximal end surface 43b of the movable lens barrel 43 abuts can only be matched with each other, and adjustment at the time of assembly of the yoke 52 is facilitated.

The invention described in the embodiment and the modifications above is not limited to the embodiment and the modifications, and besides, various changes can be carried out within the range without departing from the gist of the invention in the implementation stage. The embodiment and the modifications described above include the inventions at various stages, and various inventions can be extracted by appropriate combinations in the plurality of components that are disclosed.

For example, even when several components are deleted from all the components shown in the embodiment and the modifications, the configuration from which the components are deleted can be extracted as the invention if the problem that is mentioned can be solved, and the effect that is mentioned can be obtained.

What is claimed is:

1. An optical unit comprising:
   a moving barrel configured to hold an optical element configuring a lens unit configured to form an object image, and formed of a nonmagnetic body;
   a fixed barrel configured to accommodate the moving barrel to be able to advance and retract between a first position and a second position in a direction along an optical axis of the lens unit;
   a first magnet provided at the fixed barrel, and configured to attract the moving barrel in a first direction along the optical axis to hold the moving barrel at the first position;
   a coil configured to attract the moving barrel in a second direction opposite to the first direction along the optical axis to hold the moving barrel at the second position, by a magnetic field generated by being energized; and
   a second magnet provided at the moving barrel, and configured to be attracted by the first magnet and the magnetic field of the coil,
   wherein
   the first magnet is provided on a distal end side of the fixed barrel, and the coil is provided on a proximal end side of the fixed barrel,
   the optical unit includes a yoke configured to increase the magnetic field of the coil, and
   in a state in which the moving barrel is held at the second position, the yoke and the second magnet are placed at a position at which a distal end surface of the yoke and a proximal end surface of the second magnet correspond to each other in a direction orthogonal to the optical axis.

2. The optical unit according to claim 1,
   wherein a second magnetic force generated from the coil is larger than a first magnetic force of the first magnet.

3. The optical unit according to claim 1,
   wherein the optical element is set so that a state in which the moving barrel is held at the first position is a far point observation, and a state in which the moving barrel is held at the second position is a near point observation.

4. An image pickup apparatus loaded on a distal end portion of an insertion portion of an endoscope, the image pickup apparatus comprising:
   the optical unit according to claim 1; and
   an image pickup device configured to receive light condensed and formed by the optical element and photoelectrically convert the light.

5. An endoscope comprising:
   the image pickup apparatus according to claim 4; and
   the insertion portion in which the image pickup apparatus is loaded on the distal end portion.

6. A driving method of an optical unit, comprising:
   when moving a moving barrel held at a first position by a first magnetic force of a first magnet to a second position, passing a current in a predetermined direction to a coil to cause the coil to generate a second magnetic force stronger than the first magnetic force, attracting a second magnet provided at the moving barrel by the second magnetic force to move the moving barrel to the second position, and holding the moving barrel at the second position by the second magnetic force; and
   when moving the moving barrel to the first position from the second position, passing a current in an opposite direction to the predetermined direction to the coil for only a predetermined time, inverting the second magnetic force to attract the second magnet of the moving barrel by a repulsion force to move the moving barrel to the first position, and holding the moving barrel at the first position only by an attraction force by the first magnetic force of the first magnet after stopping energization to the coil,
wherein
the moving barrel is accommodated in a fixed barrel to be able to advance and retract between the first position and the second position,
the first magnet is provided on a distal end side of the fixed barrel, and the coil is provided on a proximal end side of the fixed barrel,
the optical unit includes a yoke configured to increase the magnetic field of the coil, and
in a state in which the moving barrel is held at the second position, the yoke and the second magnet are placed at a position at which a distal end surface of the yoke and a proximal end surface of the second magnet correspond to each other in a direction orthogonal to an optical axis.

* * * * *